(12) United States Patent
Kim

(10) Patent No.: US 8,712,187 B2
(45) Date of Patent: Apr. 29, 2014

(54) IMAGE PROCESSING APPARATUS AND IMAGE PROCESSING METHOD

(75) Inventor: Jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 556 days.

(21) Appl. No.: 12/646,353

(22) Filed: Dec. 23, 2009

(65) Prior Publication Data

US 2011/0002557 A1 Jan. 6, 2011

(30) Foreign Application Priority Data

Jul. 6, 2009 (KR) ........................ 10-2009-0061194

(51) Int. Cl.
*G06K 9/36* (2006.01)

(52) U.S. Cl.
USPC ........... 382/285; 382/218; 382/295; 382/275; 382/154

(58) Field of Classification Search
USPC ........................ 382/218, 285, 294, 275, 154
See application file for complete search history.

(56) References Cited

U.S. PATENT DOCUMENTS

| 6,624,935 B2 * | 9/2003 | Weissman et al. ............ 359/464 |
| 2003/0098907 A1 | 5/2003 | Naske |
| 2011/0285824 A1 * | 11/2011 | Bar-Zohar et al. .............. 348/46 |

FOREIGN PATENT DOCUMENTS

KR 10-0838351 B1 6/2008

OTHER PUBLICATIONS

Communciation and Extended European Search Report issued on Feb. 15, 2011 in the counterpart European Patent Application No. 10152010.4.
Scharstein, D. "Stereo Vision for View Synthesis" IEEE Computer Society Conference on Computer Vision and Pattern Recognition, Jun. 18-20, 1996, pp. 852-858. Retrieved from the Internet: http://www.computer.org/portal/web/csdl/doi/10.1109/CVPR.1996.517171.
Kang, S. B. "A Survey of Image-based Rendering Techniques", Cambridge Research Laboratory, Technical Reports Series, Aug. 1997, pp. 1-37. Retrieved from Internet: http://www.hpl.hp.com/techreports/Compaq-DEC/CRL-97-4.htm.
Zhang, C. et., al. "A survey on image-based rendering-representation, sampling and compression", Signal Processing: Image Communication, vol. 19, No. 1, Jan. 1, 2004, pp. 1-28.
Mark, W. R. et., al. "Efficient Reconstruction Techniques for Post-Rendering 3D Image Warping", UNC CS Technical Report # TR98-011, Mar. 21, 1998, pp. 1-14.
Dhong, U. R. et., al. "Structure from Stereo—A Review", IEEE Transactions on System, Man and Cybernetics, New York, vol. 19, No. 6, Nov. 1, 1989, pp. 1489-1510.

* cited by examiner

*Primary Examiner* — Ruiping Li
(74) *Attorney, Agent, or Firm* — Sughrue Mion, PLLC

(57) ABSTRACT

Disclosed are an image processing apparatus and an image processing method for producing a three-dimensional image frame. The image processing method includes: applying an offset value to an object abstracted from a two-dimensional image frame; obtaining image information corresponding to a distorted area from another image frame; and compensating the distorted area with the obtained image information, with respect to the distorted area of the image information in the two-dimensional image frame by the offset value.

8 Claims, 6 Drawing Sheets

(A)

IMAGE PROCESSING APPARATUS AND IMAGE PROCESSING METHOD

CROSS-REFERENCE TO RELATED APPLICATION

This application claims priority from Korean Patent Application No. 10-2009-0061194, filed on Jul. 6, 2009 in the Korean Intellectual Property Office, the disclosure of which is incorporated herein by reference.

BACKGROUND OF INVENTION

1. Field of Invention

Apparatuses and methods consistent with the present invention relate to an image processing apparatus and an image processing method which can process and display a three-dimensional image, and more particularly, to an image processing apparatus and an image processing method which can compensate an artifact of a three-dimensional image.

2. Description of the Related Art

An image processing apparatus applies various processes to an externally input image, and displays the processed image on its own display panel or outputs it to another image processing apparatus. Recently, the image processing apparatus has selectively processed a two-dimensional image without distinction between a left-eye image and a right-eye image and a three-dimensional image with the distinction between the left-eye image and the right-eye image.

In the case of processing the three-dimensional image, the image processing apparatus processes the left-eye image and the right-eye image to be alternately displayed, so that a three-dimensional effect can be given to a user through difference in an angle of vision between his/her left and right eyes.

The three-dimensional image is either based on a case where the left-eye image and the right-eye image are separately provided when initially input to the image processing apparatus or a case where the two-dimensional image is input and then the left- and right-eye images are produced on the basis of the two-dimensional image. In the former case, it can be easily achieved and there is no need of separate compensation for image quality, but the amount of data to be processed is relatively large. In the latter case, the amount of data to be processed is relatively small and it can be applied to the two-dimensional image, but there arises an artifact that information about an image is lost when producing the three-dimensional image.

Accordingly, while producing the left- and right-eye images on the basis of the two-dimensional image, it is important for the image processing apparatus to compensate the artifact in order to secure the quality of the image to be finally displayed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention provides an image processing method for producing a three-dimensional image frame, wherein the method may include: applying an offset value to an object abstracted from a first image frame to obtain an offset image frame; and obtaining image information corresponding to a distorted area from a second image frame; and compensating the distorted area with the obtained image information, with respect to the distorted area of the image information in the first image frame by the offset value.

The obtaining of the image information may be performed if a degree of similarity between the offset image frame and the second image frame is equal to or higher than a preset value.

The degree of similarity between the offset image frame and the second image frame may be determined based on a determining of whether the object exists in both the offset image frame and the second image frame.

The determining of whether the object exists in both the offset image frame and the second image frame may include: detecting a first pixel area in the offset image frame; detecting a second pixel area in the second image frame; and determining whether image information in the first pixel area is substantially equal to image information in the second pixel area.

The detecting of the first and second pixel areas may be performed so as to exclude pixels of the object.

The determining of whether the degree of similarity between the offset image frame and the second image frame is higher than the preset value may include: determining whether the object exists in both the offset image frame and the second image frame; and determining that the degree of similarity between the offset image frame and the second image frame is lower than the preset value if the object does not exist in both the offset image frame and the second image frame.

The obtaining of the image information may include obtaining information from one of a previous and a next neighbor image frame, with respect to the offset image frame.

Another aspect of the present invention provides an image processing apparatus for producing a three-dimensional image frame, wherein the apparatus may include: an image receiver which receives an image; and an image processor which: applies an offset value to an object abstracted from a first image frame of the received image to obtain an offset image frame, obtains image information corresponding to a distorted area from the second image frame, and compensates the distorted area with the obtained image information, with respect to the distorted area of the image information in the first image frame by the offset value.

The image processor may obtain the image information corresponding to the distorted area from the second image frame if a degree of similarity is equal to or higher than the preset value.

The image processor may determine if the degree of similarity is equal to or higher than the preset value by determining whether the object exists in both the offset image frame and the second image frame.

The image processor may determine whether the object exists in each image frame by: detecting a first pixel area in the offset image frame, detecting a second pixel area in the second image frame, and determining whether image information in the first pixel area is substantially equal to image information in the second pixel area.

The detecting of the first and second pixel areas may be performed so as to exclude pixels of the object.

The image processor may determine that the degree of similarity between the image frames is lower than the preset value if the object does not exist in each image frame.

The image processor may selectively obtain the image information from one of a previous and a next neighbor image frame, with respect to the offset image frame.

Another aspect of the present invention provides an image processing method which may include: producing a three-dimensional image frame by applying an offset value to an object abstracted from a two-dimensional image frame; and obtaining image information corresponding to a distorted area from another image frame, and compensating the distorted area with the obtained image information, with respect to the distorted area of the image information in the two-dimensional image frame by the offset value.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
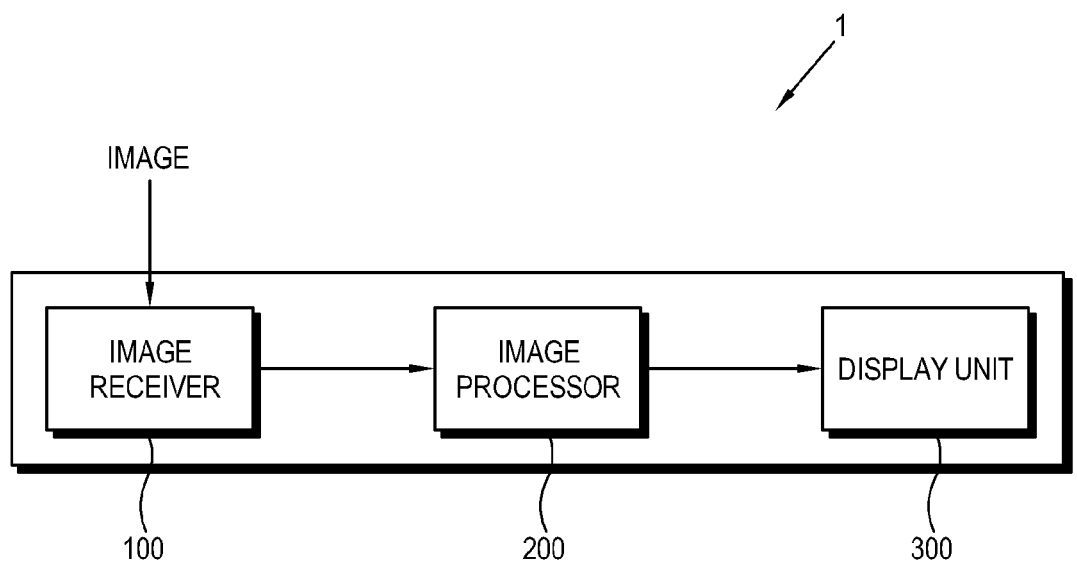
FIG. 1 is a block diagram of an image processing apparatus according to an exemplary embodiment of the present invention.

Below, exemplary embodiments of the present invention will be described in detail with reference to accompanying drawings so as to be easily realized by a person having ordinary knowledge in the art. The present invention may be embodied in various forms without being limited to the exemplary embodiments set forth herein. Descriptions of well-known parts are omitted for clarity, and like reference numerals refer to like elements throughout.

Referring to the accompanying drawings, exemplary embodiments of the present invention are as follows.

FIG. 1 is a block diagram schematically showing an image processing apparatus 1 according to an exemplary embodiment of the present invention.

The image processing apparatus 1 is not limited to this exemplary embodiment, and may include all apparatuses that can process an image received from the outside or stored therein through various methods. For example, the image processing apparatus 1 may be achieved by a television (TV), a monitor, etc. provided with a display panel such as a liquid crystal display panel or a plasma display panel to display an image by itself. Alternatively, the image processing apparatus 1 may be achieved by a set-top box, a digital versatile disc (DVD)/blue-ray disc player, etc. without the display panel, which can process an image and transmit it to the external TV or monitor.

As shown in FIG. 1, the image processing apparatus 1 in this exemplary embodiment can process a two-dimensional image and a three-dimensional image. In more detail, the image processing apparatus 1 in this embodiment can produce and process the three-dimensional image including a left-eye image and a right-eye image from the two-dimensional image. Of course, without limitation, the image processing apparatus 1 may process the two-dimensional image to be directly displayed without converting the two-dimensional image into the three-dimensional image, or process the three-dimensional image input as it is divided into the left-eye image and the right-eye image to be displayed.

In this exemplary embodiment, a case where a three-dimensional image is produced on the basis of an input two-dimensional image will be described, but the function of the image processing apparatus 1 is not limited thereto.

The image processing apparatus 1 includes an image receiver 100 to receive an input image, and an image processor 200 to process the received image to be displayed. Further, the image processing apparatus 1 may additionally include a display unit 300 to display an image processed by the image processor 200.

When the three-dimensional image is produced on the basis of the two-dimensional image, an artifact, i.e., an area where image information is distorted, arises on a predetermined image frame. The image processor 200 in this exemplary embodiment obtains image information corresponding to the distorted area from another image frame different from the above image frame, and compensates the distorted area with the obtained image information, thereby producing a three-dimensional image frame.

Thus, the distorted area of the three-dimensional image frame is compensated with the image information having high reliability, thereby securing the quality of the displayed image.

Below, elements of the image processing apparatus 1 will be described.

The image receiver 100 receives a video signal from an image source without limitation. The video signal received in the image receiver 100 may be a video signal corresponding to the two-dimensional image or a video signal corresponding to the three-dimensional image.

The image receiver 100 may have various standards as follows. For example, if the TV is used as the image processing apparatus 1, the image receiver 100 may wirelessly receive a radio frequency (RF) signal from a broadcasting station (not shown), or may receive a video signal based on composite video standards, component video standards, super video standards, Scart standards, high definition multimedia interface (HDMI) standards, etc. Also, the image receiver 100 may receive a video signal based on D-Sub, digital video interactive (DVI), HDMI standards, etc. through which red, green and blue (RGB) signals of video graphics array (VGA) can be transmitted if a computer monitor is used as the image processing apparatus 1.

The image processor 200 applies preset various image processes to the video signal transmitted from the image receiver 100. The kinds of image processes performed in the image processor 200 are not limited. For example, the image processes may include decoding and encoding corresponding to various video formats, de-interlacing, conversion of frame refresh rate, scaling, noise reduction for improving image quality, detail enhancement, etc.

The image processor 200 may be provided as separate elements to perform such image processes, respectively, or a single element where various functions are integrated.

If the video signal input to the image receiver 100 corresponds to the two-dimensional image, the image processor 200 in this exemplary embodiment produces the three-dimensional image on the basis of the input two-dimensional image and processes the produced three-dimensional image to be displayed. The image processor 200 may process the video signal in units of a frame by which the image is displayed on the display unit 300. In this exemplary embodiment, it will be described that the image processor 200 processes an image in units of such an image frame. However, this exemplary embodiment is nothing but an example which cannot limit the scope of the present invention.

Figure 2:
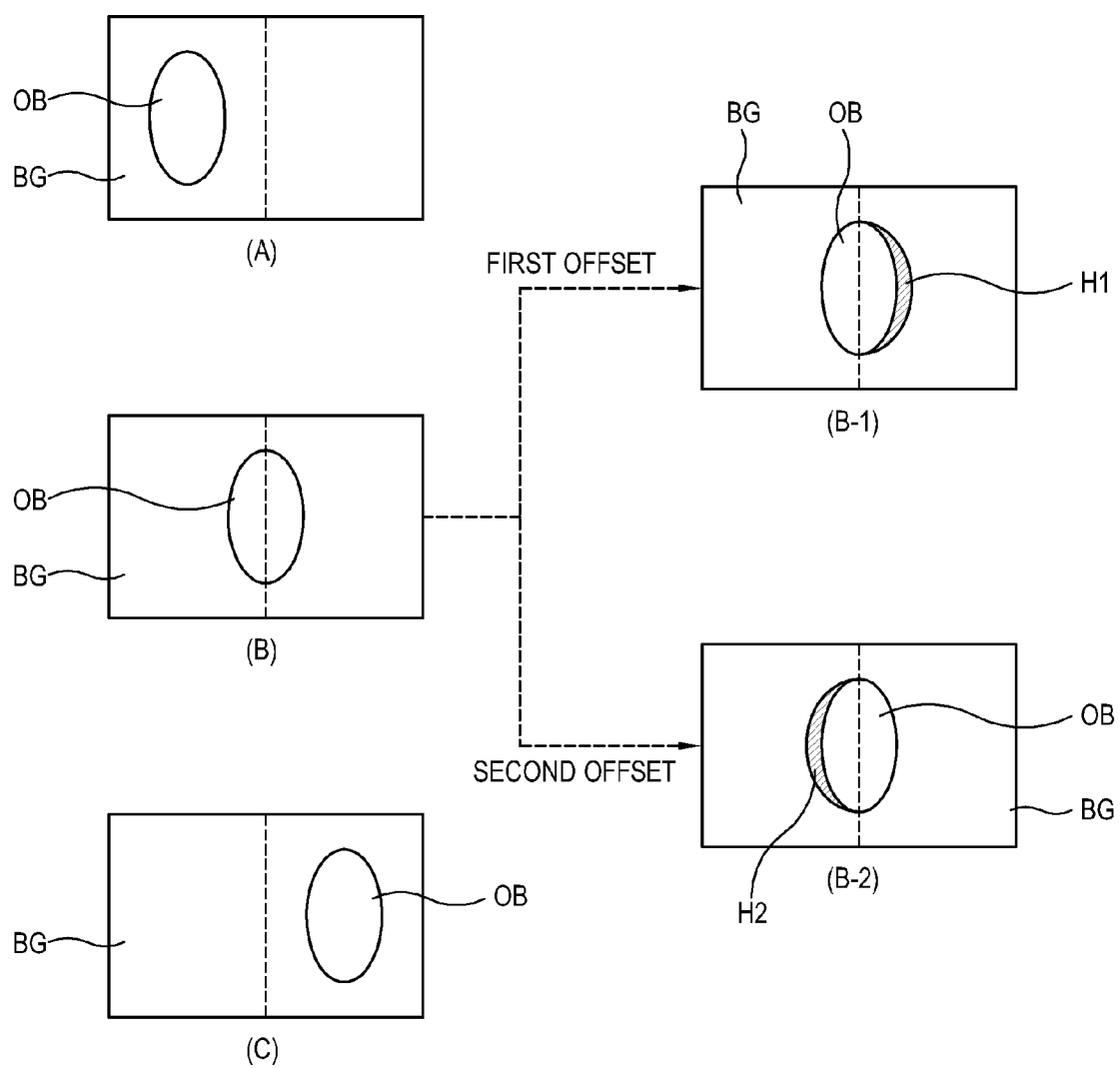
FIG. 2 shows an example that an image processor produces a three-dimensional image frame from a two-dimensional image frame in the image processing apparatus.

Below, a method of producing a three-dimensional image frame from a two-dimensional image frame through the image processor 200 will be described with reference to FIG. 2. FIG. 2 shows an example that a left-eye image frame and a right-eye image frame are each produced from a two-dimensional image frame.

Figure 5:
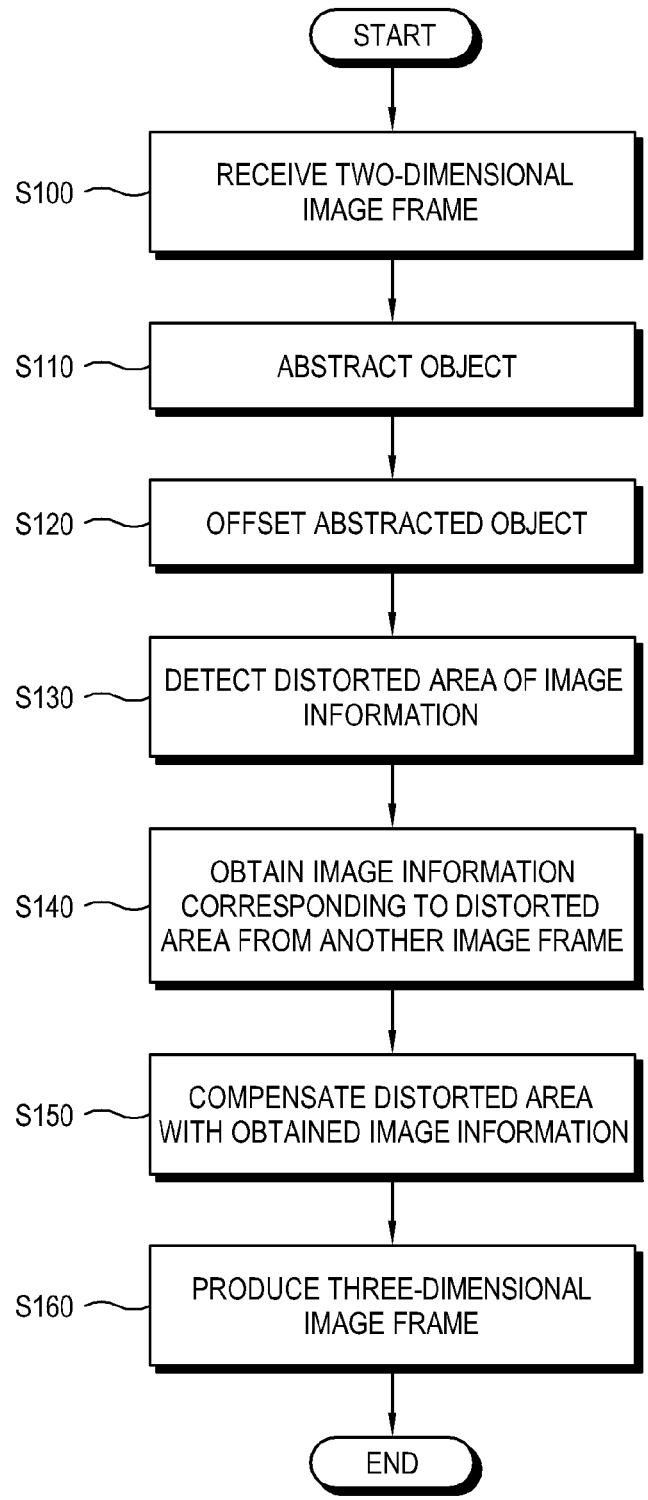
FIG. 5 is a control flowchart of an image processing method according to an exemplary embodiment of the present invention.

As shown in FIG. 2, the image processor 200 produces a three-dimensional image frame on the basis of continuous two-dimensional image frames. In FIG. 5, A, B and C indicate sequential two-dimensional image frames, and each two-dimensional image frames includes an object OB and a background BG.

The object OB is a pixel area of the image frame, to which a difference in an angle of vision between a user's left and right eyes is applied, and the background BG is a pixel area excluding the object OB from the image frame. Within one image frame, the object OB and the background BG may be set up to be variously designated. For example, if an image of a plane flying in the sky is given, the plane may be designated as the object OB, and the sky may be designated as the background BG.

A method of producing a three-dimensional image frame on the basis of the two-dimensional image frame B is as follows.

The image processor 220 abstracts the object OB from the two-dimensional image frame B. There is different in an angle of vision between a user's left and right eyes, so that he/she can recognize a predetermined object as a solid. Thus, the image processor 200 stores a first offset value and a second offset value previously set corresponding to a user's left and right eye visions, respectively. Here, the first and second offset values are not limited and may vary depending on environments of the image processing apparatus 1.

The image processing apparatus 200 individually applies the first and second offset values to the abstracted object OB, and thus produces left- and right-eye image frames B-1 and B-2 corresponding to the left and right eye visions, respectively. Since the offset is not applied with respect to the background BG, the objects of the three-dimensional image frames B-1 and B-2 are different in a relative position.

The first offset value and the second offset value are set up in consideration of the angle of vision between a user's left and right eyes, so that pixel positions of the object OB within the produced three-dimensional image frame can vary depending on which offset value is applied.

However, the position variance of the object OB causes areas H1 and H2 of image information to be distorted in the three-dimensional image frames B-1 and B-2, respectively, that is, causes an artifact. These distorted areas H1 and H2 are generated in a right side of the object OB in the case of the left-eye image frame B-1 and a left side of the object OB in the case of the right-eye image frame B-2, respectively.

The distorted areas H1 and H2 are generated because the offset is applied to only the object OB except the background BG. The distorted areas H1 and H2 are formed in partial pixel areas of the left or right boundaries of the object OB on the background BG. Since the distorted areas H1 and H2 correspond to an area where the object OB is positioned on the two-dimensional image frame B, corresponding image information does not exist or is distorted in the three-dimensional image frames B-1 and B-2. Therefore, if the distorted areas H1 and H2 are not compensated, the quality of a displayed image is deteriorated.

Accordingly, the image processor 200 obtains the image information from another image frame A or C, which is different from the two-dimensional image frame B, thereby applying the compensation to the distorted areas H1 and H2 generated when producing the three-dimensional image frames B-1 and B-2 from the two-dimensional image frame B.

Specifically, the image processor 200 selectively obtains image information corresponding to the distorted areas H1 and H2 from a precedent or subsequent temporal neighbor image frame A or C to the two-dimensional image frame B. This is because the temporal neighbor image frames have higher probability of including more similar information.

Here, the image processor 200 detects a degree of similarity of image information between the offset image frame B1-1, B-2 and another image frame A, C, and obtains image information from the image frame A, C of which similarity is higher than a preset value and which is determined as it has similar image information.

Below, a method of detecting a degree of similarity of image information between image frames will be described in detail. However, it should be noted that this method is merely an example, and the scope of the present invention includes various configurations which may be employed to detect the degree of similarity.

As used herein, the phrase "a degree of similarity" is synonymous with "a similarity." Also, as used herein, the phrase "similarity of image information" (e.g., between image information of the offset image frame and image information another image frame) is used synonymously with phrases simply describing a similarity between image frames (e.g., "the degree of similarity between the image frame B-1 and the image frame A"), i.e., where the phrase "image information" has been omitted for brevity.

To detect the degree of similarity between the image frame B-1 and the image frame A, the image processor 200 first determines whether the same object OB exist in the image frames B-1 and A. If there is no same object OB, the image processor 200 determines that image frames B-1 and A are not similar to each other.

If there is the same object OB, the image processor 200 sets up a range of a pixel area of which similarity will be determined. The pixel area to be determined may be set up as the whole image frame, or as a predetermined range of the pixel area including the object OB in each image frame B-1 and A. In this exemplary embodiment, the similarity is detected throughout the image frame, but not limited thereto. Alternatively, the pixel area to be determined may be set up variously.

In the case where the pixel area to be determined is set up as one full image frame, the amount of data to be process increases, and the reliability of similarity detection is lowered as the pixel area to be determined becomes smaller. Thus, the pixel area to be determined is properly set up in consideration of the processing load and the reliability.

The image processor 200 detects a pixel area except the same object OB, i.e., the background BG from each image frame B-1, A. Then, the image processor 200 determines whether a percentage of a pixel area having substantially the same image information between the backgrounds BG is equal to or higher than a preset value. The preset value may vary depending on characteristics of the image processing apparatus 1.

Substantially the same image information may be involved in not only a case that pixels of each image frame B-1, A have the same image information, but also a case that a motion amount of objects included in the background BG other than the object OB to be offset is equal to or lower than a preset value. For example, with respect to an image of a vehicle passing through roadside trees, if the vehicle is regarded as an object OB to be offset and the others are regarded as a background BG, the roadside trees have substantially the same image information when the motion amount of the roadside trees is equal to or lower than a preset value.

The image processor 200 may determine that the similarity between two image frames B-1 and A is equal to or higher than a preset value, i.e., the two image frames B-1 and A are similar to each other if a percentage of a pixel area having substantially the same image information between the background BG of the image frame B-1 and the background BG of the image frame A is equal to or higher than a preset value.

In the case that it is determined that the two image frames are similar, a method of compensating the distorted areas in the image frames B-1 and B-2 will be described with reference to FIGS. 3 and 4.

Figure 3:
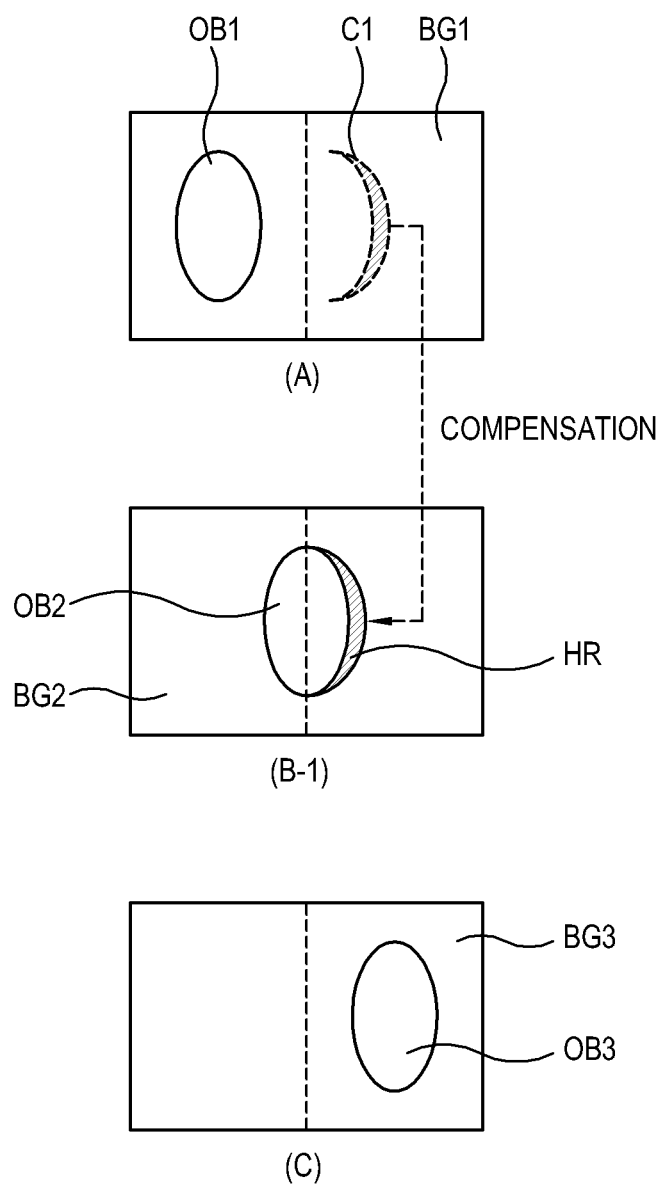
FIG. 3 shows an example of compensating a distorted area of a left-eye image frame in the three-dimensional image frame.

FIG. 3 shows an example of compensating a distorted area HR of a left-eye image frame B-1.

As shown therein, the image processor 200 produces a left-eye image frame B-1 by applying first offset to the two-dimensional image frame B, and reads the previous and next neighbor image frames A and C to the two-dimensional image frame B to thereby compensate the distorted area HR generated in the left-eye image frame B-1.

The image processor 200 selectively obtains the image information for compensation, i.e., the image information corresponding to the distorted area HR from one of the image frames A and C in order to compensate the distorted area HR of the image frame B-1. In FIG. 3, the image processor 200 obtains image information of a pixel position C1 corresponding to the distorted area HR, but not limited thereto. Here, a pixel at the same position is more likely to have the same image information.

The image processor 200 compensates the distorted area HR with the obtained image information. Thus, that the image information of the image frame B-1 is lost by the distorted area HR is minimized, so that an image can be displayed naturally.

Like this, the image processor 200 selectively obtains the image information for the compensation from either of the image frame A or the image frame C, but not limited thereto. Alternatively, the image processor 200 may automatically selects either of the image frame A or the image frame C in consideration of a moving direction of the objects OB1, OB2 and OB3 due to the course of the image frame and the position of the distorted area HR with respect to the object OB2.

In FIG. 3, the objects OB1, OB2 and OB3 move from the left to the right. Further, the distorted area HR of the left-eye image frame B-1 is formed at the right of the object OB2.

If the image frames are given in order of A, B-1 and C and the objects OB1, OB2 and OB3 move from the left to the right, the object OB2 in the image frame B-1 moves in a right direction where the distorted area HR is placed. Thus, the pixel position corresponding to the distorted area HR in the image frame C is more likely to be not the background BG3 but the object OB3. On the other hand, the pixel position C1 corresponding to the distorted area HR in the image frame A is more likely to be not the object OB1 but the background BG1.

For example, if the objects OB1, OB2 and OB3 move from the left to the right, and the distorted area HR is formed at the right of the object OB2, the image information for the compensation is obtained from the previous image frame A.

Figure 4:
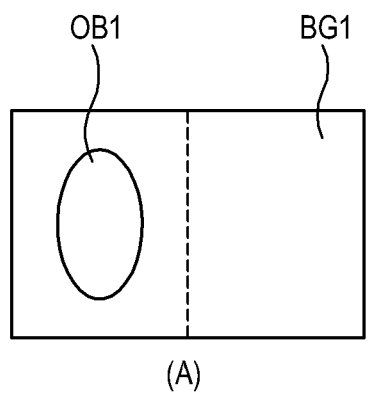
FIG. 4 shows an example of compensating a distorted area of a right-eye image frame in the three-dimensional image frame.
Figure 4:
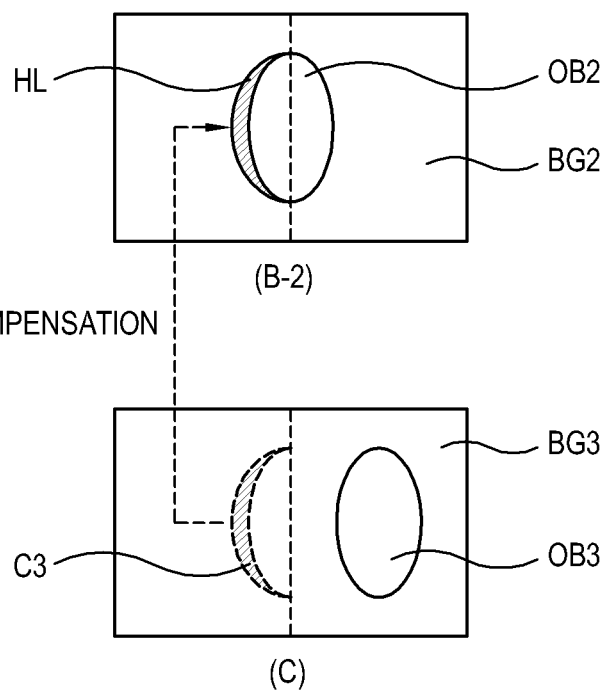

FIG. 4 shows an example of compensating a distorted area HL of a right-eye image frame B-2.

As shown in FIG. 4, the image processor 200 produces a right-eye image frame B-2 by applying second offset to the two-dimensional image frame B, and reads the previous and next neighbor image frames A and C to the two-dimensional image frame B to thereby compensate the distorted area HL generated in the right-eye image frame B-2.

The image processor 200 selectively obtains the image information for compensation, i.e., the image information corresponding to the distorted area HL from one of the image frames A and C in order to compensate the distorted area HL of the image frame B-2. The image processor 200 compensates the distorted area HL with the obtained image information.

In FIG. 4, the objects OB1, OB2 and OB3 move in the same direction from the left to the right as those of FIG. 3. However, the distorted area HL of the right-eye image frame B-2 is formed at the left of the object OB2.

If the image frames are given in order of A, B-1 and C and the objects OB1, OB2 and OB3 move from the left to the right, the objects OB1, OB2 and OB3 move in an opposite direction where the distorted area HL is formed. In this case, a pixel area corresponding to the distorted area HL in the previous image frame A is more likely to be not the background BG1 but the object OB1, so that the image processor 200 can obtain the image information from the pixel area C3 of the subsequent image frame C more likely to be not the object OB3 but the background BG3.

On the other hand, in the case where the objects OB1, OB2 and OB3 move from the right to the left, the cases of FIGS. 3 and 4 may be applicable, and therefore repetitive descriptions thereof will be omitted. Consequently, if the moving direction of the objects OB1, OB2 and OB3 is the same as the forming direction of the distorted area HR, HL to the object OB2, the image information for compensating each distorted area HR, HL can be obtained from the previous image frame. On the other hand, if the moving direction of the objects OB1, OB2 and OB3 is different from the forming direction of the distorted area HR, HL to the object OB2, the image information for compensating each distorted area HR, HL can be obtained from the next image frame.

According to an exemplary embodiment of the present invention, when the three-dimensional image frame is produced by offsetting the two-dimensional image frame, the image information for compensating the distorted area is obtained from another neighbor image frame to the corresponding image from to thereby compensate the distorted area generated in the offset image frame.

If the image information for compensating the distorted area is obtained from different pixel area of one image frame, the quality of the compensated distorted area is relatively lowered, which is more significant as the distorted area becomes larger. In comparison, the present exemplary embodiment obtains the image information for the compensation from another image frame having image information similar to that of the offset image frame, thereby more enhancing the quality of the compensated distorted area.

Below, an image processing method according to this exemplary embodiment will be described with reference to FIG. 5. FIG. 5 is a control flowchart of this image processing method.

As shown in FIG. 5, at operation S100 the image processor 200 receives the two-dimensional image frame from the image receiver 100 when the image receiver 100 receives a video signal.

At operation S110, the image processor 200 abstracts the objects, to which the offset will be applied, from the received two-dimensional image frame. At operation S120, the image processor 200 applies the offset to the abstracted object. The image processor 200 applies the different offset values during this offset operation, thereby producing the left-eye image frame and the right-eye image frame, respectively.

At operation S130, the image processor 200 detects the distorted area of the image information from the offset image frame. The image processor 200 obtains the image information corresponding to the distorted area from another image frame other than the offset image frame at operation S140, and applies the obtained image information to compensate the distorted area at operation S150.

At operation S160, the image processor 200 produces the three-dimensional image frame by completing the compensation for the distorted area. The image processor 200 applies these operations to the sequent two-dimensional image frames, thereby generating the three-dimensional image frame from the individual image frames.

Figure 6:
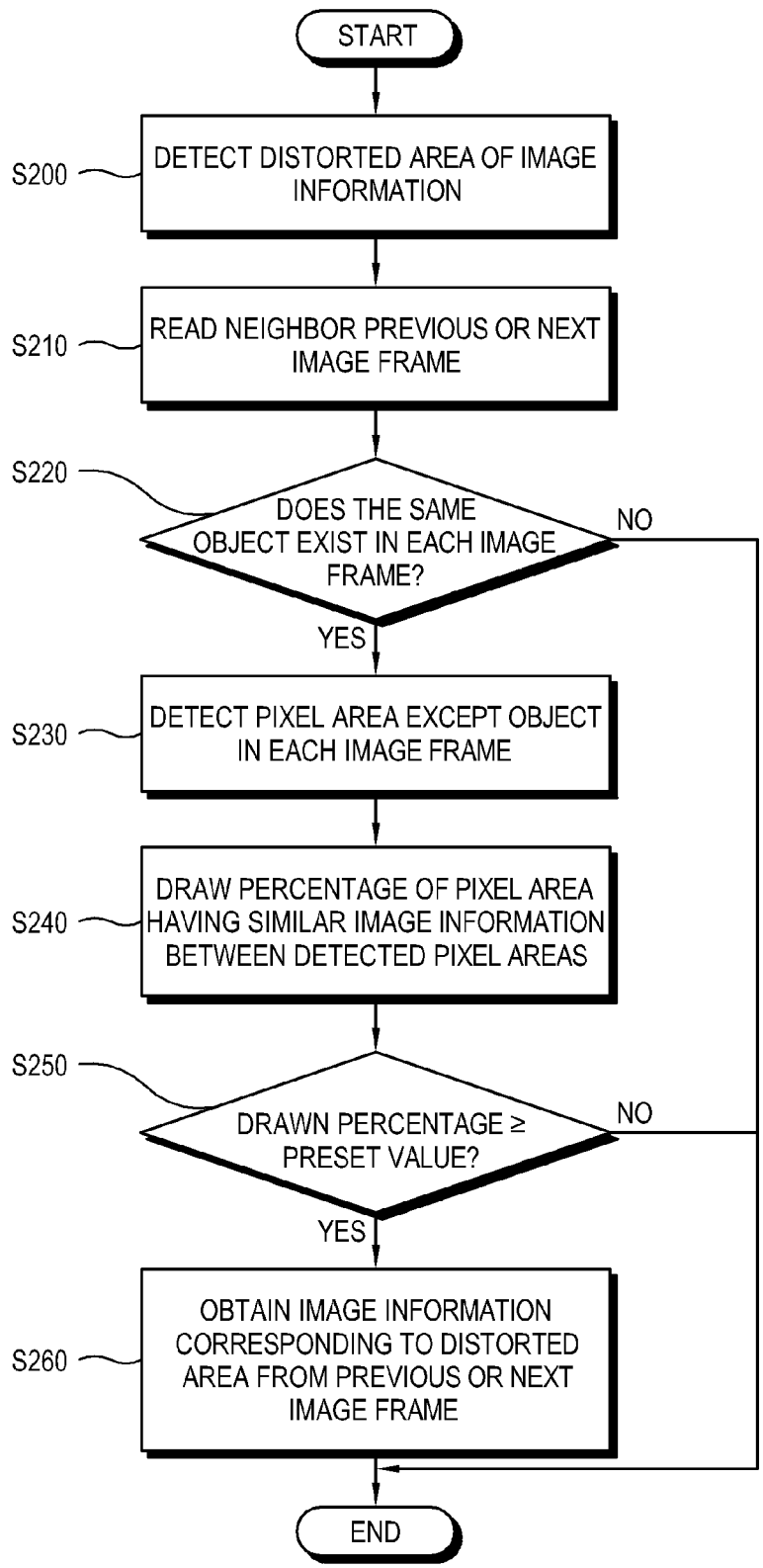
FIG. 6 is a control flowchart of obtaining image information for compensating the distorted image.

Below, the operation S140 of FIG. 5, i.e., a method of obtaining the image information for compensating the distorted area will be described in more detail with reference to FIG. 6. FIG. 6 is a control flowchart of this method.

As shown in FIG. 6, the image processor 200 detects the distorted area of the image information from the offset image frame at operation S200, and reads the previous or next neighbor image frame to the offset image frame at operation S210.

At operation S220, the image processor 200 determines whether the same object exists in each neighbor image frame, i.e., whether the object to be offset exists in every image frame.

If the same object exists, the image processor 200 detects the pixel area excluding the object from each image frame at operation S230. Then, at operation S240 the image processor 200 draw a percentage of the pixel area having similar image information between the pixel areas detected according to the image frames.

If the drawn percentage is equal to or higher than a preset value at operation S250, the image processor 200 obtains the image information corresponding to the distorted area from the read previous or next image frame at operation S260. The image processor 200 compensates the distorted area with the obtained image information.

Meanwhile, at the operations S220 and S250 among the foregoing operations, if there is no same object in each frame or the drawn percentage is lower than the preset value, the image processor 200 determines that the respective image frames are not similar to each other. In this case, the image processor 200 may employ various methods different from that of this exemplary embodiment to compensate the distorted area.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An image processing method for producing a three-dimensional image frame, the method comprising:
    applying an offset value to an object abstracted from a first image frame to obtain an offset image frame;
    determining whether a degree of similarity between the offset image frame and a second image frame is equal to or higher than a preset value;
    obtaining image information corresponding to a distorted area from a second image frame if it is determined that the degree of similarity between the offset image frame and a second image frame is equal to or higher than the preset value; and
    replacing the distorted area with the obtained image information,
    wherein the first image frame and the second image frame are two-dimensional image frames, and
    the first image frame is one of a plurality of image frames of a video signal and the second image frame is one of a previous image frame of the first image frame and a next image frame of the first image frame among the plurality of image frames of the video signal,
    wherein the degree of similarity between the offset image frame and the second image frame is determined based on a determining of whether the object exists in both the offset image frame and the second image frame,
    wherein the determining of whether the object exists in both the offset image frame and the second image frame comprises:
    detecting a first pixel area in the offset image frame;
    detecting a second pixel area in the second image frame; and
    determining whether image information in the first pixel area is substantially equal to image information in the second pixel area, and
    wherein the detecting of the first and second pixel areas is performed so as to exclude pixels of the object.

2. The image processing method according to claim 1, wherein the obtaining of the image information includes obtaining information from one of a previous neighbor image and a next neighbor image frame, with respect to the offset image frame.

3. An image processing apparatus for producing a three-dimensional image frame, the apparatus comprising:
    an image receiver which receives an image; and
    an image processor which applies an offset value to an object abstracted from a first two-dimensional image frame of the received image to obtain an offset image frame, obtains image information corresponding to a distorted area from a second two-dimensional image frame if a degree of similarity between the first and second two-dimensional image frames is equal to or higher than a preset value, and replaces the distorted area with the obtained image information,
    wherein the first two-dimensional image frame is one of a plurality of image frames of a video signal and the second two-dimensional image frame is one of a previous image frame of the first two-dimensional frame and a next image frame of the first two-dimensional frame among the plurality of image frames of the video signal,
    wherein the image processor determines if the degree of similarity is equal to or higher than the preset value by determining whether the object exists in both the offset image frame and the second image frame, and
    wherein the image processor determines whether the object exists in each image frame by detecting a first pixel area in the offset image frame, detecting a second pixel area in the second image frame, and determining whether image information in the first pixel area is substantially equal to image information in the second pixel area.

4. The image processing apparatus according to claim 3, wherein the detecting of the first and second pixel areas is performed so as to exclude pixels of the object.

5. The image processing apparatus according to claim 3, wherein the image processor selectively obtains the image information from one of a previous and a next neighbor image frame, with respect to the offset image frame.

6. A video processing method, the method comprising:
forming a three-dimensional video by separating a two-dimensional video into a pair of stereoscopic videos and offsetting one or more objects abstracted from the two dimensional video;
identifying image information of an area of a first two-dimensional frame distorted by the offsetting of one or more objects;
determining whether a degree of similarity between the first and second two-dimensional image frames is equal to or higher than a preset value;
identifying an area of a second two-dimensional frame corresponding to the distorted area of the first frame if the degree of similarity between the first and second two-dimensional image frames is equal to or higher than a preset value; and
replacing the distorted area of the first two-dimensional frame with the identified image information, wherein the first two-dimensional frame is one of a plurality of image frames of a video signal and the second two-dimensional frame is one of a previous frame of the first two-dimensional frame and a next frame of the first two-dimensional frame among the plurality of image frames of the video signal,
wherein the degree of similarity between the offset image frame and the second image frame is determined based on a determining of whether the object exists in both the offset image frame and the second image frame,
wherein the determining of whether the object exists in both the offset image frame and the second image frame comprises:
detecting a first pixel area in the offset image frame;
detecting a second pixel area in the second image frame; and
determining whether image information in the first pixel area is substantially equal to image information in the second pixel area, and
wherein the detecting of the first and second pixel areas is performed so as to exclude pixels of the object.

7. The image processing method according to claim 1, wherein the determining whether the degree of similarity between the offset image frame and the second image frame is equal to higher than the preset value comprises:
determining whether the object exists in both the offset image frame and the second image frame; and
determining that the degree of similarity between the offset image frame and the second image frame is lower than the preset value if the object does not exist in both the offset image frame and the second image frame.

8. The image processing apparatus according to claim 3, wherein the image processor determines that the degree of similarity between the first and second two-dimensional image frames is lower than the preset value if the object does not exist in each image frame.

* * * * *